United States Patent
Saito et al.

(10) Patent No.: US 6,908,703 B2
(45) Date of Patent: Jun. 21, 2005

(54) SEALED BATTERY HAVING AN ELECTRODE SUBSTRATE EXPOSED PORTION EXTENDING FROM THE ELECTRODE ASSEMBLY

(75) Inventors: Masayuki Saito, Hyogo (JP); Akira Hirakawa, Hyogo (JP); Yasuhisa Yamada, Hyogo (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 332 days.

(21) Appl. No.: 10/229,135

(22) Filed: Aug. 28, 2002

(65) Prior Publication Data

US 2003/0049523 A1 Mar. 13, 2003

(30) Foreign Application Priority Data

Aug. 30, 2001 (JP) ........................................ 2001-261721

(51) Int. Cl.[7] ............................ H01M 2/22; H01M 2/26
(52) U.S. Cl. ........................ 429/94; 429/164; 429/169
(58) Field of Search ......................... 429/94, 161, 164, 429/169, 174, 233

(56) References Cited

U.S. PATENT DOCUMENTS

| | | | | |
|---|---|---|---|---|
| 5,208,122 A | * | 5/1993 | Hirakawa et al. | 429/222 |
| 5,281,495 A | * | 1/1994 | Hirakawa et al. | 429/217 |
| 5,912,091 A | * | 6/1999 | Daio et al. | 429/94 |
| 5,958,620 A | * | 9/1999 | Nagaura | 429/164 |
| 6,391,488 B1 | * | 5/2002 | Shimizu et al. | 429/94 |

FOREIGN PATENT DOCUMENTS

JP     2001085066 A  *  3/2001  .......... H01M/10/40

* cited by examiner

*Primary Examiner*—Gregg Cantelmo
(74) *Attorney, Agent, or Firm*—Westerman, Hattori, Daniels & Adrian LLP (57) ABSTRACT

A sealed battery has an outer can having an opening and functioning as an electrode terminal, a sealing member fitted in the opening of the outer can and functioning as an electrode terminal which is different in polarity from the outer can, and a spiral-wound electrode assembly contained in the outer can. The spiral-wound electrode assembly includes a positive electrode, a negative electrode and a separator wound together spirally, in which the electrodes are separated by the separator and the outermost coil of the separator forms the outer circumferential face of the spiral-wound electrode assembly. A substrate included in the positive or negative electrode which is adjacent to the outermost coil of the separator has an exposed portion, which projects in the axial direction of the spiral-wound electrode assembly beyond the outermost coil of the separator and is in direct contact with the inner face of the outer can.

7 Claims, 8 Drawing Sheets

SEALED BATTERY HAVING AN ELECTRODE SUBSTRATE EXPOSED PORTION EXTENDING FROM THE ELECTRODE ASSEMBLY

BACKGROUND OF THE INVENTION

1. Field of the Invention

The present invention relates to a sealed battery.

2. Description of the Related Art

In recent years, development and spread of various electrical machines and devices have been encouraging wide use of batteries, especially sealed alkaline storage batteries as power sources thereof. As representative examples of sealed alkaline storage batteries, a nickel-cadmium storage battery, a nickel-hydrogen storage battery and the like can be mentioned.

Figure 1:
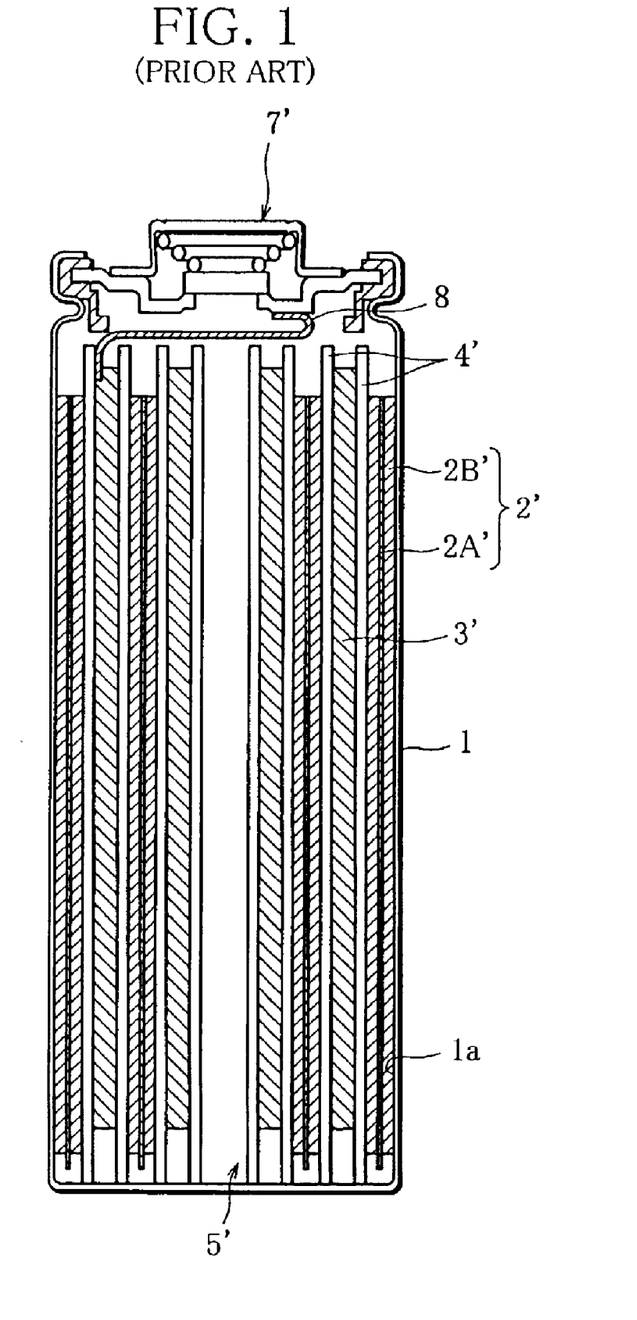
FIG. 1 is a cross-sectional view of a conventional nickel-cadmium storage battery.

Generally, batteries of this type have a structure shown in FIG. 1, and produced in the following way: A negative electrode 2' and a positive electrode 3' with a separator 4' between are wound spirally into a spiral-wound electrode assembly 5'. After the spiral-wound electrode assembly 5' is inserted into an outer can 1 through its opening, an alkaline electrolyte is injected into the outer can 1. Last, the opening of the outer can 1 is sealed with a sealing member 7'.

The positive electrode 3' comprises a positive electrode substrate and a positive active material layer supported by the positive electrode substrate, while the negative electrode 2' comprises a negative electrode substrate 2A' and a negative active material layer 2B' supported by the negative electrode substrate 2B'. The positive electrode substrate and the negative electrode substrate 2A' are each made of a metal having good electroconductivity. The positive active material layer and the negative active material layer 2B' each contains active material, for example, in powder form, and if necessary, a binder for increasing binding strength between powders and between powders and the substrate.

As a negative electrode 2' of this type, for example, a paste-type cadmium negative electrode is produced in the following way: Negative active material which contains cadmium oxide powder as a main component, and a binder including hydroxy propyl cellulose are mixed to prepare negative electrode active material slurry. The negative electrode active material slurry is applied on both sides of a nickel punching sheet which forms a negative electrode substrate 2A', and then dried.

Regarding the above-described battery structure, there are two main modes of current collection from the negative electrode 2', or in other words, two main modes of electrically connecting the negative electrode 2' and the outer can 1. In a first mode, a current collector prepared separately is welded to the lower end of the negative electrode substrate 2A' of the spiral-wound electrode assembly 5', and also welded to the bottom of the outer can. In a second mode, as shown in FIG. 1, the negative active material layer 2B' which forms the outer circumferential face of the spiral-wound electrode assembly 5' is brought in direct contact with the inner side face 1a of the outer can 1.

In the second mode, it is not necessary to prepare a current collector and weld it to the spiral-wound electrode assembly and to the bottom of the outer can. Thus, when a battery is produced in the second mode, the production cost can be lower than when it is produced in the first mode. Thus, the second mode is employed in many batteries.

However, if the second mode is employed in the case where the binding strength of the negative active material layer 2B' is weak, trouble may happen. That is, in the step of inserting the spiral-wound electrode assembly 5' into the outer can 1, when the negative active material layer 2B' touches the edge of the opening or the inner side face 1a of the outer can 1, parts of the negative active material layer 2B' may fall off the negative electrode 2'. This causes problems such as lowering of the battery capacity, and in the worst case, the parts of the negative active material layer which have fallen off short-circuit the negative and positive electrodes.

In order to avoid these problems, it is conceivable to increase the amount of the binder contained in the negative active material layer to thereby increase the binding strength. However, this solution is not desirable, because, in this case, the proportion of the active material contained in the negative active material layer decreases, and the battery capacity decreases accordingly.

In this connection, for example, in the case where a paste-type cadmium negative electrode is employed, there is known a method in which cadmium oxide, which is active material, is changed into cadmium hydroxide to increase the binding strength of powders themselves to thereby increase the binding strength of the active material layer.

However, this method has a problem: In order to increase the binding strength of the negative active material layer, a new step needs to be added to the process of producing a battery, which increases the production cost accordingly.

The above-mentioned problems come from employing the second mode in order to eliminate the cost of preparing a current collector and welding it to the outer can. Thus, in order to avoid the above-mentioned problems, it is conceivable to employ the first mode in which a current collector is used, in place of the second mode. However, when the first mode is employed, increase in production cost is inevitable.

Further, if the second mode is employed in the case where the electroconductivity of the negative active material layer 2B' is low, there happens a problem: What is in direct contact with the inner side face 1a of the outer can 1 is the negative active material layer 2B' supported by the negative electrode substrate 2A'. Thus, when the electroconductivity of the negative active material layer 2B' is low, the contact resistance between the inner side face 1a and the negative active material layer 2B' is large and varies to a large degree, and accordingly, the internal resistance of the battery is large and varies to a large degree.

However, it is known that, in the case where the electroconductivity of the negative active material layer is low, if, for example, a sponge nickel substrate or a porous sintered nickel substrate is employed as the negative electrode substrate, it compensates for the low electroconductivity of the negative active material layer 2B'. Specifically, since numberless small holes in the sponge nickel substrate or porous sintered nickel substrate are filled with the active material, the sponge nickel substrate or porous sintered nickel substrate provides current paths, to thereby compensate for the low electroconductivity of the negative active material layer.

However, the negative electrode using the sponge nickel substrate has a problem: Since the sponge nickel substrate is costly, the material cost is high. Also, the negative electrode using the porous sintered nickel substrate has a problem: In order to produce the porous sintered nickel substrate, sintering needs to be performed to turn nickel powder, which is a material for the negative electrode substrate, into a porous material. Thus, when the battery is produced using this negative electrode, the production cost increases because of the material cost of nickel powder and the cost of sintering.

The object of the present invention is to provide, at low cost, a sealed battery wherein current can be collected from the negative electrode effectively without using a current collector, even if the binding strength of the negative active material layer is weak, and wherein the internal resistance of the battery is small and does not vary to a large degree, even if the electroconductivity of the negative active material layer is low.

SUMMARY OF THE INVENTION

A sealed battery according to the present invention comprises an outer can having an opening and functioning also as an electrode terminal; a sealing member fitted in the opening of the outer can and functioning also as an electrode terminal which is different in polarity from the outer can; a spiral-wound electrode assembly contained in the outer can, the spiral-wound electrode assembly consisting of a positive electrode, a negative electrode and a separator wound together spirally, in which the positive electrode and the negative electrodes is separated by the separator and the outermost coil of the separator forms the outer circumferential face of the spiral-wound electrode; and a substrate included in the positive or negative electrode which is adjacent to the outermost coil of the separator, said substrate having an exposed portion which projects in the axial direction of the spiral-wound electrode assembly beyond the outermost coil of the separator and is in direct contact with the inner face of the outer can.

In a desirable mode, the exposed portion has at least one cut, and the part of the exposed portion which is delimited by the cut projects outward in the radial direction of the spiral-wound electrode assembly and is in direct contact with the inner side face of the outer can.

In another desirable mode, the exposed portion has at least one convex portion which projects outward in the radial direction of the spiral-wound electrode assembly and is in direct contact with the inner side face of the outer can.

In another desirable mode, the exposed portion has at least one bent portion which projects outward in the radial direction of the spiral-wound electrode assembly and is in direct contact with the inner side face of the outer can.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

The sealed battery according to the present invention will be described on the basis of the drawings.

Figure 2:
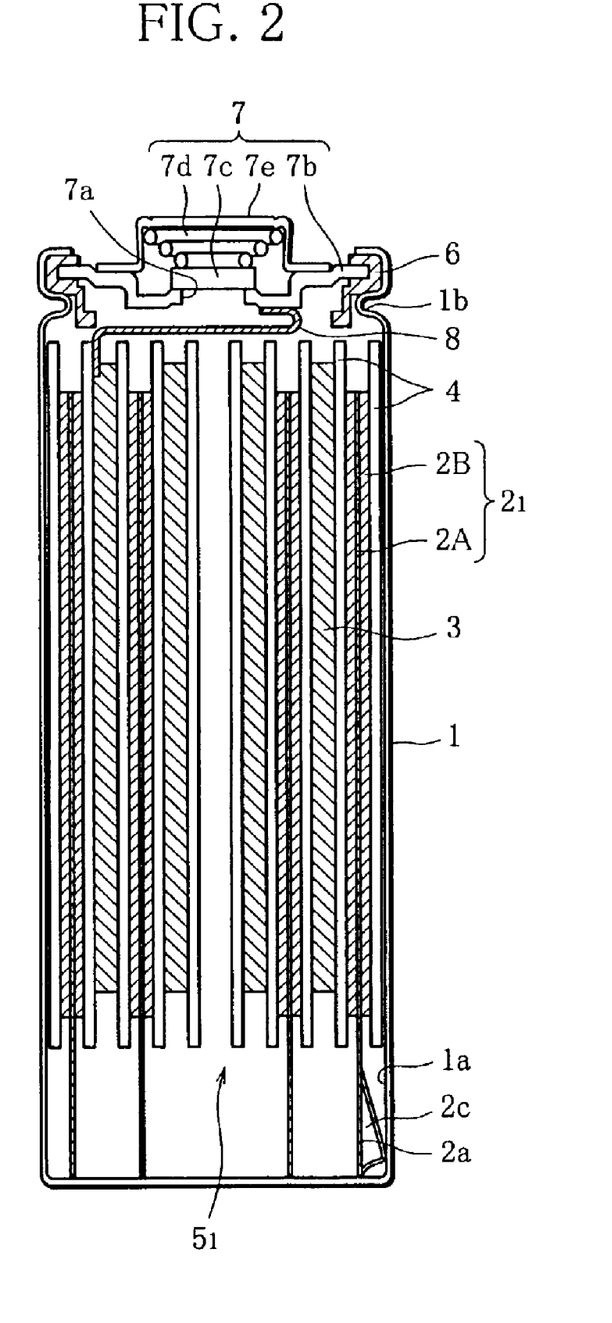
FIG. 2 is a cross-sectional view of a nickel-cadmium storage battery A according to one mode of the present invention.

FIG. 2 is a cross-sectional view of a nickel-cadmium storage battery A (hereinafter referred to as "battery A") according to one mode of a sealed battery according to the present invention. It is to be noted that in FIG. 2, elements of the battery A which are substantively the same in function and form as elements of the conventional nickel-cadmium storage battery shown in FIG. 1 are denoted by the same reference signs.

The battery A has an outer can 1 made of metal. The outer can 1 is in the shape of a cylinder closed at the bottom and open at the top. The outer can 1 contains a spiral-wound electrode assembly $5_1$, which is formed by spirally winding a negative electrode $2_1$ and a positive electrode 3 with a separator 4 between, and an alkaline electrolyte (not shown).

The edge of the opening of the outer can 1 is caulked, and a sealing member 7 is fitted in the caulked portion with an insulative gasket 6 between to thereby seal the outer can 1 air-tightly.

The sealing member 7 includes a sealing plate 7b with a hole 7a in the center, a safety vent 7c for closing the hole 7a, a coiled spring 7d for pressing the safety vent 7c against the sealing plate 7b, and a cap 7e for covering the safety vent 7c and the coiled spring 7d. If gas is produced abnormally in the outer can 1 and the internal pressure increases, the safety vent 7c is raised by the internal pressure and allows the gas to escape through the hole 7a. Thus, the sealing member 7 serves to restrict increase in pressure in the outer can 1.

To the upper end of the positive electrode 3 of the spiral-wound electrode assembly $5_1$ is spot-welded one end of a positive current collector 8. The other end of the positive current collector 8 is spot-welded to the inner surface of the sealing plate 7b. Thus, the sealing member 7, which functions also as a positive electrode terminal, and the positive electrode 3 of the spiral-wound electrode assembly $5_1$ are electrically connected by the positive current collector 8.

Regarding the spiral-wound electrode assembly $5_1$, a part of the separator 4 forms the outer circumferential face of the spiral-wound electrode assembly $5_1$. The negative electrode $2_1$ of the spiral-wound electrode assembly $5_1$ and the outer can 1, which functions also as a negative electrode terminal, are electrically connected in the manner that the negative electrode substrate 2A, which projects in the axial direction of the spiral-wound electrode assembly $5_1$, or in other words, downward beyond the lower ends of the positive electrode 3 and the separator 4 of the spiral-wound electrode assembly $5_1$, is brought in direct contact with the inner face, more specifically, the inner bottom face and the inner side face of the outer can 1.

Figure 3:
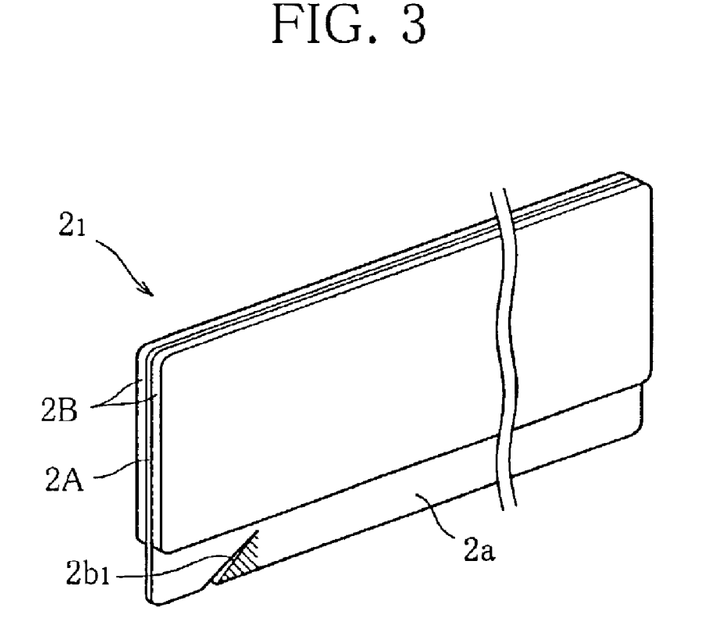
FIG. 3 is a perspective view of a cadmium negative electrode for use in the nickel-cadmium storage battery A of FIG. 2.
Figure 4:
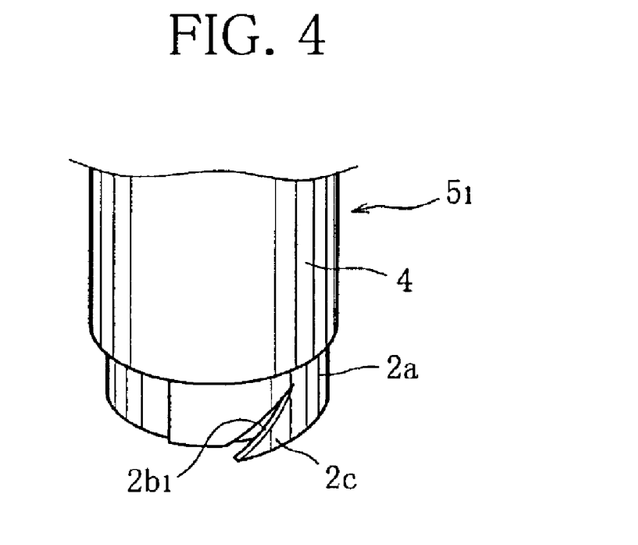
FIG. 4 is a perspective view of part of a spiral-wound electrode assembly for use in the nickel-cadmium storage battery A of FIG. 2.

In order to be connected this way, the negative electrode substrate 2A is larger in width than the positive electrode 3 and the separator 4, and has an exposed portion 2a. This exposed portion 2a projects beyond the lower ends of the positive electrode 3 and the separator 4 of the spiral-wound electrode assembly $5_1$. As shown in FIG. 3, a diagonal cut $2b_1$ is formed in the exposed portion 2a in the part which will form the outermost coil of the exposed portion 2a. As shown in FIG. 4, in a state that the spiral-wound electrode assembly $5_1$ is contained in the outer can, a triangular portion delimited by the cut $2b_1$ (hatched portion) forms a protrusion 2c. The protrusion 2c projects outward as viewed in the radial direction of the spiral-wound electrode assembly $5_1$ beyond the outermost coil of the separator 4, and is in direct contact with the inner side face 1a of the outer can 1.

In the battery A having the above-described structure, not the negative electrode $2_1$ but the separator 4 forms the outer circumferential face of the spiral-wound electrode assembly $5_1$. Thus, when the spiral-wound electrode assembly $5_1$ is inserted in the outer can 1, the active material layer 2B falling off the negative electrode $2_1$ is prevented.

Further, in the battery A, the protrusion 2c made of a metal having high electroconductivity is in direct contact with the inner side face 1a of the outer can 1. This ensures that the internal resistance is small and does not vary to a large degree, not depending on the electroconductivity of the negative active material layer 2B.

Figure 5:
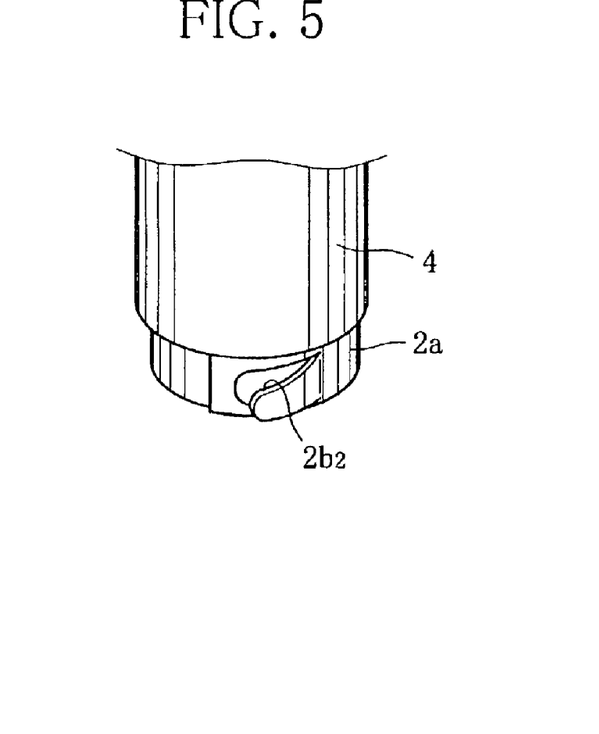
FIG. 5 is a perspective view of part of another spiral-wound electrode assembly for use in the nickel-cadmium storage battery A of FIG. 2.
Figure 6:
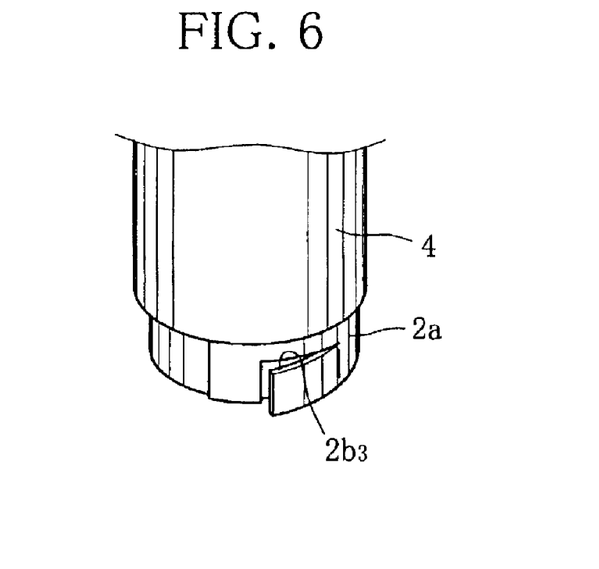
FIG. 6 is a perspective view of part of another spiral-wound electrode assembly for use in the nickel-cadmium storage battery A of FIG. 2.

While in the present mode, the diagonal cut $2b_1$ is formed in the exposed portion 2a, the cut may be of a parabolic shape or an L shape like cuts $2b_2$ and $2b_3$ shown in FIGS. 5 and 6. The cut may be of any shape as long as it enables a part of the exposed portion to project outward as viewed in the radial direction of the spiral-wound electrode assembly $5_1$.

Figure 7:
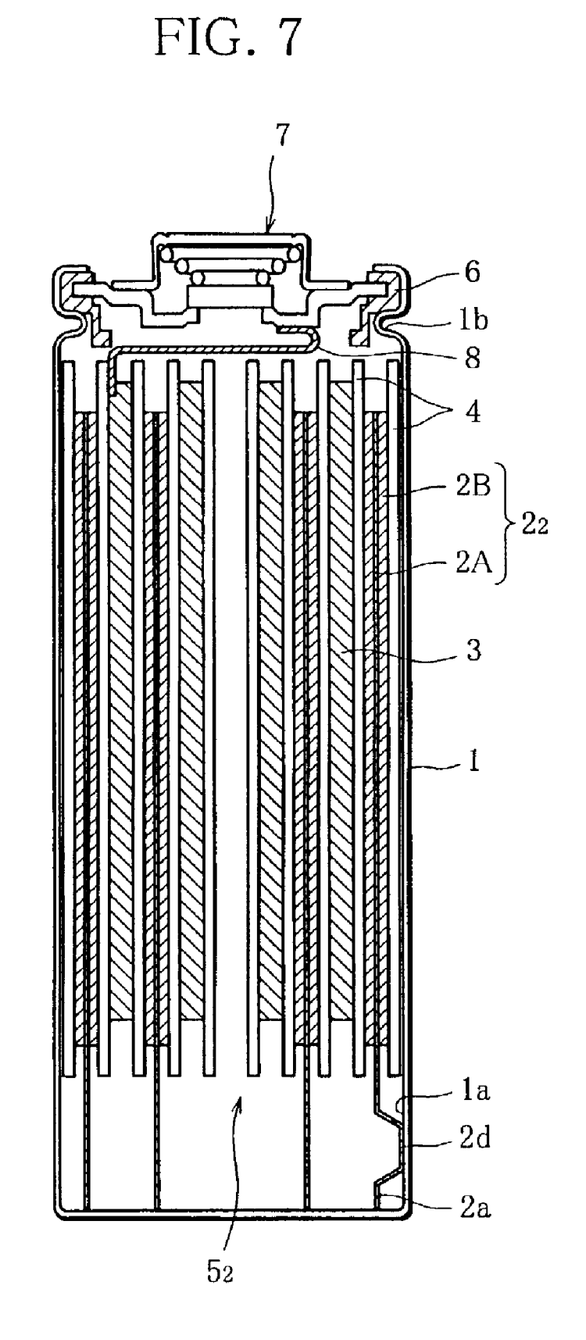
FIG. 7 is a cross-sectional view of a nickel-cadmium storage battery B according to another mode of the present invention.

FIG. 7 is a cross-sectional view of a nickel-cadmium storage battery B (hereinafter referred to as "battery B") according to another mode of a sealed battery according to the present invention.

Figure 8:
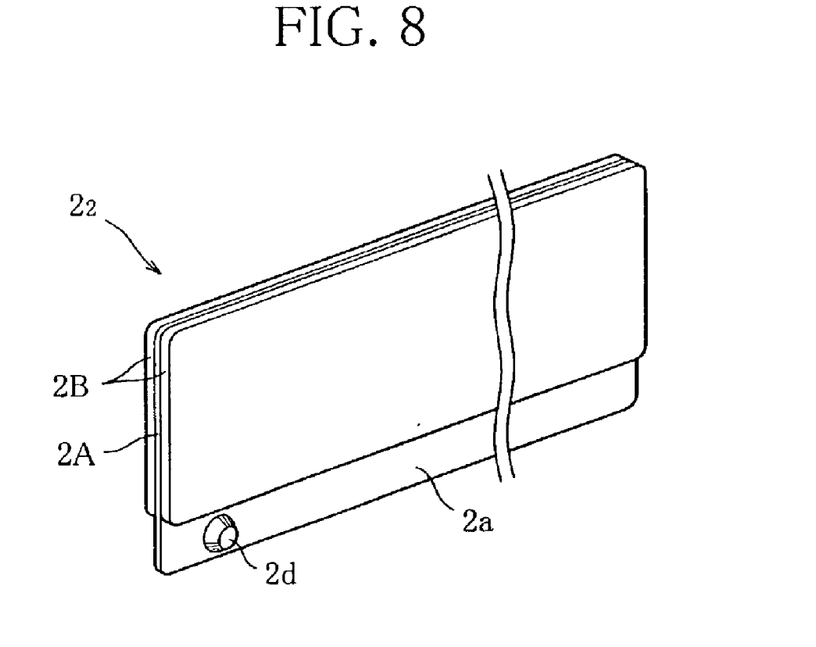
FIG. 8 is a perspective view of a cadmium negative electrode for use in the nickel-cadmium storage battery B of FIG. 7.
Figure 9:
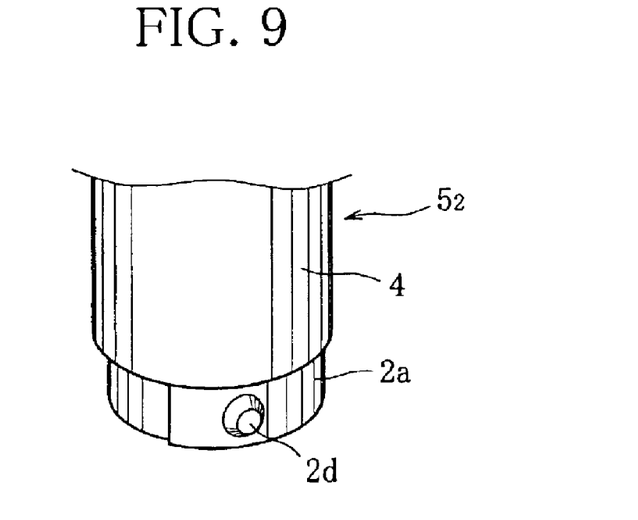
FIG. 9 is a perspective view of part of a spiral-wound electrode assembly for use in the nickel-cadmium storage battery B of FIG. 7.

In the case of the battery B, as shown in FIG. 8, the exposed portion 2a of the negative electrode substrate 2A has, instead of a protrusion 2c, one convex portion 2d in the part which will form the outermost coil of the exposed portion 2a. Thus, as shown in FIG. 9, the battery B is different from the battery A in that the convex portion 2d, which projects outward as viewed in the radial direction of the spiral-wound electrode assembly $5_2$, is in direct contact with the inner side face 1a of the outer can 1.

Also in the battery B, the separator 4 forms the outer circumferential face of the spiral-wound electrode assembly $5_2$. Thus, the active material layer 2B falling off the negative electrode $2_2$ is prevented. Further, since the convex portion 2d made of a metal having high electroconductivity projects outward as viewed in the radial direction of the spiral-wound electrode assembly $5_2$ and is in direct contact with the inner side face 1a of the outer can 1, the internal resistance is small and does not vary to a large degree.

Figure 10:
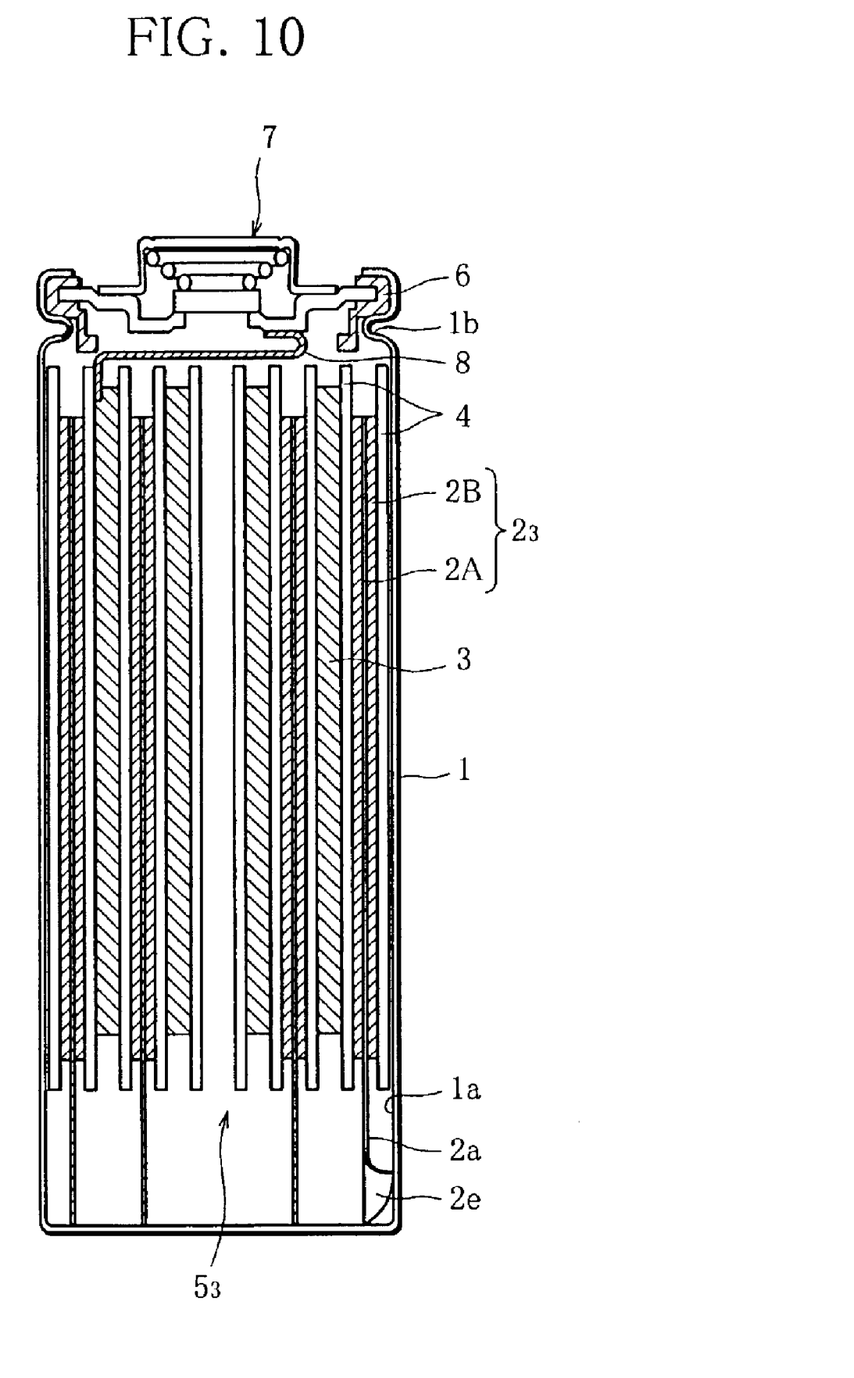
FIG. 10 is across-sectional view of a nickel-cadmium storage battery C according to another mode of the present invention.

FIG. 10 is a cross-sectional view of a nickel-cadmium storage battery C (hereinafter referred to as "battery C") according to another mode of a sealed battery according to the present invention.

Figure 11:
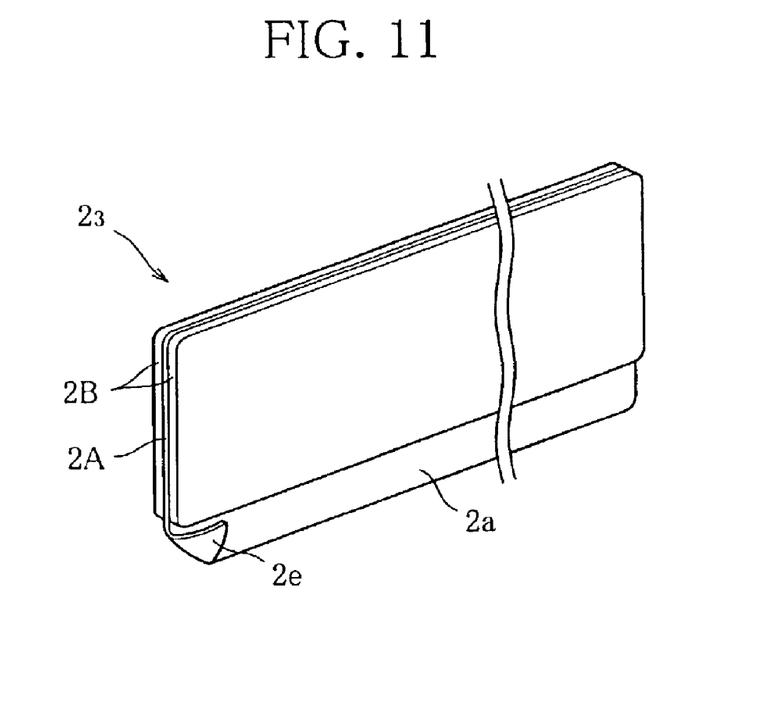
FIG. 11 is a perspective view of a cadmium negative electrode for use in the nickel-cadmium storage battery C of FIG. 10.
Figure 12:
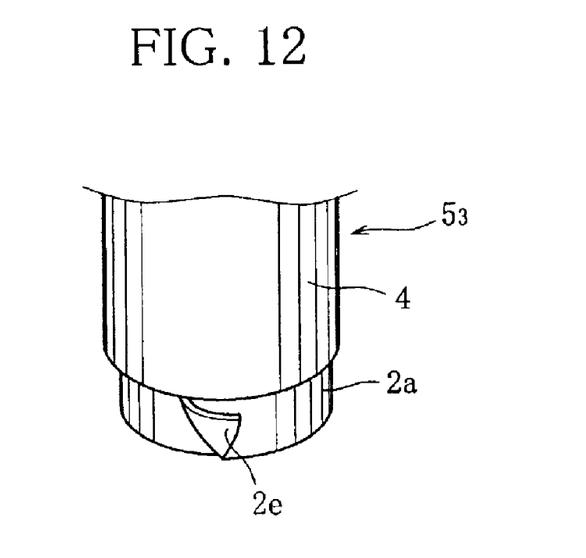
FIG. 12 is a perspective view of part of a spiral-wound electrode assembly for use in the nickel-cadmium storage battery C of FIG. 10.

In the case of the battery C, as shown in FIG. 11, the exposed portion 2a of the negative electrode substrate 2A does not have a protrusion 2c or a convex portion 2d in the part which will form the outermost coil of the exposed portion 2a. Instead, the exposed portion 2a has a bent portion 2e which is formed by bending an end part of the outermost coil of the exposed portion 2a. Thus, as shown in FIG. 12, the battery C is different from the batteries A, B in that the bent portion 2e, which projects outward as viewed in the radial direction of the spiral-wound electrode assembly $5_3$, is in direct contact with the inner side face 1a of the outer can 1.

Also in the battery C, the separator 4 forms the outer circumferential face of the spiral-wound electrode assembly $5_3$. Thus, the active material layer 2B falling off the negative electrode $2_3$ is prevented. Further, since the bent portion 2e made of a metal having high electroconductivity projects outward as viewed in the radial direction of the spiral-wound electrode assembly $5_3$ and is in direct contact with the inner side face 1a of the outer can 1, the internal resistance is small and does not vary to a large degree.

In the above-described modes, the present invention is applied to the nickel-cadmium storage battery. However, the present invention is applicable not only to the nickel-cadmium storage battery but also to other types of sealed batteries such as the nickel-hydrogen battery.

It is to be noted that the present invention requires that the substrate of the electrode which is adjacent to the outermost coil of the separator, which forms the outer cicumferential face of the spiral-wound electrode assembly, should have an exposed portion 2a, no matter whether the electrode adjacent to the outermost coil of the separator may be a positive electrode or a negative electrode. Also, it is to be noted that the number of protrusions 2c or convex portions 2d may be at least one.

Embodiment 1

Negative active material containing cadmium oxide powder as a main component, and a binder containing hydroxy propyl cellulose were mixed to prepare negative active material slurry. The negative electrode active material slurry was applied on both sides of a nickel punching sheet of 0.06 mm in thickness which was to form a negative electrode substrate 2A. Here, the negative active material slurry was not applied to the part which was to form an exposed portion of a negative electrode. The applied slurry was dried at 90° C. for 15 minutes and thereby turned into a negative active material layer 2B. Then, the nickel punching sheet was cut to be 40.5 mm in width and 85 mm in length.

Then, in the thus prepared nickel punching sheet, a cut $2b_1$ was formed as shown in FIG. 3. Specifically, the cut $2b_1$ was 6 mm in length, ran at an angle 45° to the width of the exposed portion, and was located in the part which was to form the outermost coil of the exposed portion of the negative electrode. (Here, the outermost coil of the negative electrode was to be adjacent to the outermost coil of a separator which formed the outer circumferential face of a spiral-wound electrode assembly). Thus, a cadmium negative electrode $2_1$ was produced. Here, the width of the exposed portion 2a was 5.5 mm.

Next, as a positive electrode substrate, a nickel punching sheet having surfaces of porous sintered nickel was prepared by sintering a nickel punching sheet of 0.06 mm in thickness. Then, using the well-known chemical impregnation method, the holes in the porous sintered nickel surfaces of the nickel punching sheet were filled with positive active material which contained nickel hydroxide as a main component. Then, the nickel punching sheet was cut to be 35 mm in width and 65 mm in length. Thus, a nickel positive electrode 3 was produced. Here, the width of the nickel positive electrode 3 was smaller than that of the cadmium negative electrode $2_1$ by the amount corresponding to the width of the exposed portion 2a. In other words, the width of the nickel positive electrode 3 was approximately the same as that of the negative active material layer 2B.

Between the cadmium negative electrode $2_1$ and the nickel positive electrode 3, a separator 4 made of polypropylene nonwoven fabric of 0.22 mm in thickness, 39 mm in width and 200 mm in length was arranged. Then, in a hollow cylindrical block having an inner diameter a little smaller than that of an outer can 1, the cadmium negative electrode $2_1$, nickel positive electrode 3 and separator 4 thus arranged were spirally wound into a spiral-wound electrode assembly $5_1$. Here, it was so arranged that the separator 4 formed the outer circumferential face of the spiral-wound electrode assembly $5_1$, and that the exposed portion 2a of the negative electrode projected downward beyond the lower end of the separator 4. The spiral-wound electrode assembly $5_1$ thus formed was inserted in a nickel-plated iron outer can 1 in the shape of a cylinder closed at the bottom. Here, the spiral-wound electrode assembly $5_1$ was so placed that the exposed portion 2a of the cadmium negative electrode $2_1$ was at the bottom. During this inserting step, due to the resilience of the negative electrode substrate 2A which had been wound, the part of the exposed portion 2a which was delimited by the cut $2b_1$ projected outward as viewed in the radial direction of the spiral-wound electrode assembly $5_1$ to thereby form a protrusion 2c, which came in direct contact with the inner side face 1a of the outer can 1, as shown in FIG. 2.

Then, the upper part of the outer can 1 was reduction-worked to form a narrowed portion 1b. Then, a sealing member 7 having a ring-shaped insulative gasket 6 fitted to its circumference was prepared, and a positive current collector 8 was spot-welded to the bottom of the sealing member 7.

Next, an electrolyte of which aqueous potassium hydroxide solution was a major component was injected into the outer can 1. Then, the sealing member 7 was placed on the narrowed portion 1a, and then the edge of the opening of the outer can 1 was caulked to thereby seal the outer can 1. Thus, a nickel-cadmium storage battery of embodiment 1 in AA size was produced.

Embodiment 2

A cadmium negative electrode $2_2$ was produced in the same way as the cadmium negative electrode of embodiment 1, except that in place of a cut 2b, a convex portion 2d was formed to the nickel punching sheet by embossing. Specifically, as shown in FIG. 7, the convex portion 2d was 3 mm in diameter, projected in the thickness direction of the nickel punching sheet by 1 mm, and was located in the part which was to form the outermost coil of the exposed portion 2a of the negative electrode $2_2$.

Then, a nickel-cadmium storage battery of embodiment 2 was produced in the same way as the nickel-cadmium storage battery of embodiment 1, except that the cadmium negative electrode $2_2$ was used.

In the nickel-cadmium storage battery of embodiment 2 thus produced, the convex portion 2d which projected beyond the thickness of the separator 4 was in direct contact with the inner side face 1a of the outer can 1a, as shown in FIG. 9.

Embodiment 3

A cadmium negative electrode $2_3$ of embodiment 3 was produced in the same way as the cadmium negative electrode of embodiments 1 and 2, except that in place of a cut 2b or a convex portion 2d, a bent portion 2e was formed to the nickel punching sheet. Specifically, as shown in FIG. 12, the bent portion 2e was formed by bending an end part of the outermost coil of the exposed position 2a of the negative electrode $2_3$.

Then, a nickel-cadmium storage battery of embodiment 3 was produced in the same way as the nickel-cadmium storage battery of embodiment 1, except that the cadmium negative electrode $2_3$ was used.

In the nickel-cadmium storage battery of embodiment 3 thus produced, the bent portion 2e was in direct contact with the inner side face 1a of the outer can 1, as shown in FIG. 10.

COMPARATIVE EXAMPLE 1

A cadmium negative electrode 2' was produced in the same way as the cadmium negative electrode of embodiment 1, except that both sides of a nickel punching sheet, which was to form a negative electrode substrate 2A' and was 0.06 mm in thickness, 40.5 mm in width and 85 mm in length, were almost entirely covered with negative active material layers 2B', respectively.

Further, a positive electrode 3' was produced, which was the same as the positive electrode of embodiment 1 except that the width and length thereof were 41 mm and 65 mm, respectively.

Between the cadmium negative electrode 2' and the nickel positive electrode 3' was arranged a separator 4' which was the same as the separator of embodiment 1 except that the width and the length thereof were 43.5 mm and 165 mm, respectively. The cadmium negative electrode 2', nickel positive electrode 3' and separator 4' thus arranged were spirally wound into a spiral-wound electrode assembly 5'. Here, it was so arranged that the cadmium negative electrode 4' formed the outer circumferential face of the spiral-wound electrode assembly 5'. Then, the spiral-wound electrode assembly 5' was inserted in an outer can 1 which was the same as the outer can of embodiment 1. Here, as shown in FIG. 1, the active material layer 2B' of the negative electrode 2' came in contact with the inner side face 1a of the outer can 1. Then, the battery of comparative example 1 was completed in the same way as the above-described embodiment 1. Measurement of internal resistance 30 of batteries of each of embodiments 1 to 3 and comparative example 1 were prepared, and the internal resistance (mΩ) of each battery was measured immediately after assembled. The result of the measurement is shown in table 1, where the maximum measured value, minimum measured value and average value are shown.

TABLE 1

| Type of battery | Internal resistance (mΩ) | | |
| --- | --- | --- | --- |
| | Minimum value | Maximum value | Average value |
| Embodiment 1 | 83 | 96 | 89 |
| Embodiment 2 | 83 | 94 | 87 |
| Embodiment 3 | 82 | 99 | 92 |
| Comparative example 1 | 104 | 683 | 242 |

As is clear from the result shown in table 1, the average internal resistance of the batteries of comparative example 1, in which the active material layer of the cadmium negative electrode was in direct contact with the inner side face of the outer can, was large. Further, the internal resistance varied to a large degree between the batteries. In contrast, the average internal resistance of the batteries of each of embodiments 1 to 3, in which the exposed portion of the negative electrode was in direct contact with the inner side face of the outer can, was small. Further, the internal resistance did not vary to a large degree between the batteries of each embodiment. In the batteries of comparative example 1, only the negative active material layer having low electroconductivity was in contact with the inner side face of the outer can. This explains why the internal resistance was large and varied to a large degree. In contrast, in the batteries of embodiments 1 to 3, the protrusion, convex portion or bent portion of the exposed portion 2a of the electroconductive negative electrode substrate was in contact with the outer can, directly, i.e., without the low-electroconductive negative active material layer existing between. This explains why the internal resistance was small and did not vary to a large degree.

As stated above, in the alkaline storage battery according to the present invention, the separator forms the outer circumferential face of the spiral-wound electrode assembly. This makes it possible to collect current without using a current collector, even when the binding strength of the negative active material is weak. Thus, the alkaline storage battery according to the present invention can be produced at low cost.

Further, in the alkaline storage battery according to the present invention, the exposed portion of the negative electrode substrate is in direct contact with the inner side face of the outer can. Because of this structure, the internal resistance does not vary to a large degree even when the electroconductivity of the negative active material is low.

What is claimed is:

1. A sealed battery, comprising:
    an outer can having an opening end and functioning also as an electrode terminal;
    a sealing member fitted in the opening end of the outer can and functioning also as an electrode terminal which is different in polarity from the outer can; and
    a spiral-wound electrode assembly contained in the outer can, the spiral-wound electrode assembly including a first electrode, a second electrode and a separator wound together spirally, the separator separating the first electrode from the second electrode and having an outermost coil which forms an outer circumferential face of the spiral-wound electrode assembly and is adjacent to a part of the first electrode,
    wherein the first electrode includes a substrate and an active material carried on the substrate, the substrate having an exposed portion which projects in an axial direction of the spiral-wound electrode assembly beyond the outermost coil of the separator and a protrusion, the protrusion protruding from the exposed portion outward in a radial direction of the spiral-wound electrode assembly and directly contacting an inner circumferential face of the outer can.

2. The sealed battery according to claim 1, wherein said exposed portion has at least one cut, and a part of the exposed portion delimited by the cut forms the protrusion.

3. The sealed battery according to claim 1, wherein said exposed portion has at least one convex section which forms the protrusion.

4. The sealed battery according to claim 1, wherein said exposed portion has at least bent section which forms the protrusion.

5. The sealed battery according to claim 1, wherein the first electrode is a paste type electrode.

6. The sealed battery according to claim 5, wherein the first electrode is a negative electrode.

7. The sealed battery according to claim 6, wherein the sealed battery is a nickel-cadmium battery.

* * * * *